May 12, 1953
R. H. DAVIES
2,638,243
SEALING MEANS FOR COOPERATIVELY ASSEMBLED
PARTS OF VALVE OR COMPARABLE ASSEMBLIES
Filed April 15, 1949
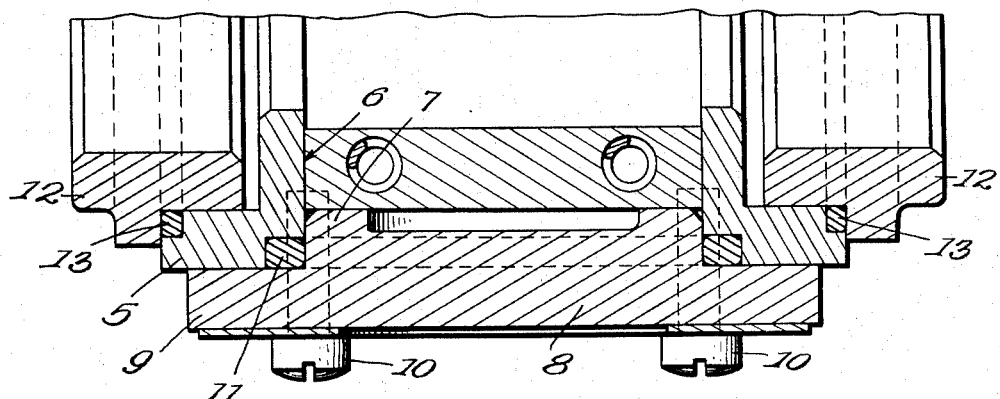
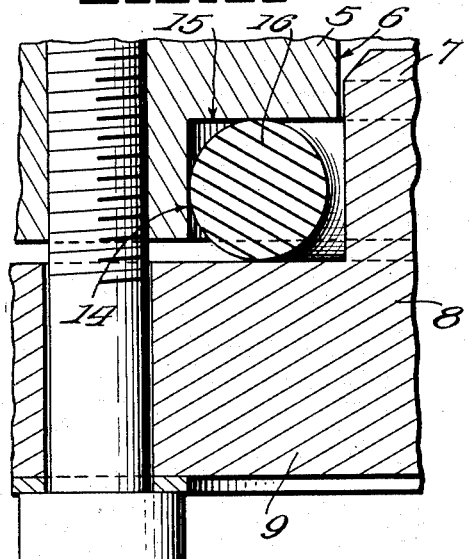
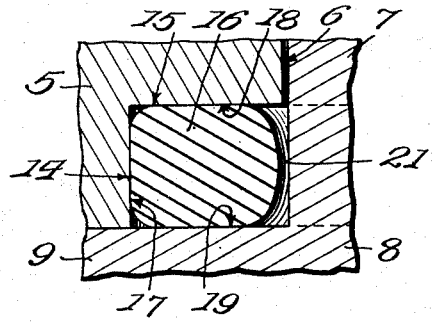
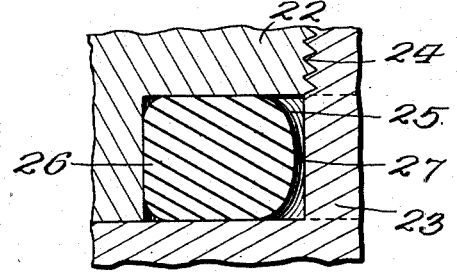
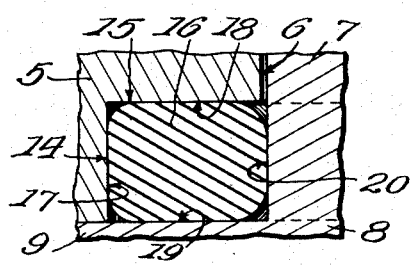
INVENTOR.
Robert H. Davies.
BY
Mason, Porter, Diller & Stewart
ATTORNEYS

Patented May 12, 1953

2,638,243

UNITED STATES PATENT OFFICE 2,638,243

SEALING MEANS FOR COOPERATIVELY ASSEMBLED PARTS OF VALVE OR COMPARABLE ASSEMBLIES

Robert H. Davies, Aurora, Ohio, assignor to The Parker Appliance Company, Cleveland, Ohio, a corporation of Ohio Application April 15, 1949, Serial No. 87,694

5 Claims. (Cl. 220—46)

The invention relates generally to sealing means and primarily seeks to provide a novel, simple and efficient means for sealing cooperatively assembled parts of valve or comparable assemblies. While subject to more general uses this sealing means is particularly adaptable for forming a fluid seal between valve assembly parts of which the casing of a fuel selector valve and the bore bottom closure plug, or such a casing and an adapter boss, form examples of cooperating parts to be sealed.

In assemblies of the character stated there usually are included a bore and counterbored female element and a male element insertable into the bore through the counterbore and including a radially enlarged portion overlying and closing the counterbore, thus causing the counterbore to form a sealing means receiving annular chamber closed by said enlarged portion and surrounding said male element. In such assemblies pressure fluid usually is present in the bores thereof and an efficient seal must be provided between the male and female elements in order to prevent egress of said fluid. I am aware that sealing rings of inherently circular cross section have been mounted in such counterbores for sealing purposes heretofore, but it is also known that previously devised seals of this character have not been entirely satisfactory because of faulty proportioning of the ring cross section and the annular sealing chamber capacity, and faulty placement of the rings in said chambers. When attempts have been made to effect a seal with a ring having a materially greater cross section than the radial width of the sealing chamber or counterbore, pinching of the ring has resulted incidental to the assembling of the male and female elements and the forcing of the ring into said chamber, and when the ring has been formed with a cross sectional area greater than the cross sectional area of the annular ring receiving or sealing chamber, extrusion by deformation and pinching of the ring also has been experienced incidental to the assembling of the male and female elements. In other cases the sealing ring has been formed of smaller cross section than the width of the sealing chamber but with the outer diameter of the ring initially less than the diameter of the outer wall of the chamber with resultant difficulty in establishing a seal for the joint. It is a purpose of the present invention to provide sealing means of the character stated in which these objectionable conditions are avoided.

It is an object of the present invention to provide a sealing means comprising a member having a bore and a counterbore and a second member having an extension receivable in the bore and a flange for overlying and closing the counterbore to form a packing chamber, and with a sealing ring within said counterbore initially projecting a slight amount therefrom, said extension being insertable through said sealing ring but initially out of contact therewith so as to avoid pinching of the ring during said insertion.

It is another object of the invention to provide a sealing means comprising a member having a bore and a counterbore and a second member having an extension receivable in the bore and a flange for overlying and closing the counterbore to form a packing chamber, and with a sealing ring within said counterbore initially projecting a slight amount therefrom, said extension being insertable through said sealing ring but initially out of contact therewith so as to avoid pinching of the ring during said insertion, and said packing being initially in contact with the flange and outer wall and deformable first by said flange and then by fluid pressure into still tighter sealing contact with said outer wall and the flange.

Another object of the invention is to provide a sealing means of the character stated in which the cross section of the sealing ring is greater than the depth of the counterbore, so that upon assembly of the male and female elements the male element enlargement will engage a portion of the ring extending in an axial direction beyond the counterbore and deform the ring in said counterbore, the area of said ring cross section being equal or slightly less than the area of the radial cross section of the receiving or sealing chamber formed in said counterbore so that there will be no extrusion of the ring from the counterbore and pinching thereof between the male and female elements when the elements are in their final assembly position.

Another object of the invention is to provide a sealing means of the character stated wherein the sealing ring has an initial outside diameter the same as or very slightly larger than the outside diameter of the counterbore, so as to be self-retaining therein during assembly, and wherein the radial dimension of said counterbore is so proportioned with relation to the ring cross section and the depth of the counterbore that upon complete assembly of the male and female elements and deformation of the ring cross section, said ring will have major contact at the outside diameter and base of the counterbore and against the male element enlargement, but only minor contact against the main body of the male element passing therethrough, whereby pressure fluid finding its way into the sealing chamber will be capable of displacing only that portion of the ring which is in minor contact so as to act behind or within the ring outwardly from the male element portion passing therethrough and be effective to deform the ring in a manner for causing the three major contacting portions thereof to engage in tighter sealing contact.

Another object of the invention is to provide a sealing means of the character last stated wherein the radial dimension of the counterbore is so proportioned with relation to the ring cross section and the depth of the counterbore that upon complete assembly of the male and female elements and deformation of the ring cross section said ring will contact only at the outside diameter and base of the counterbore and against the male element enlargement, thereby leaving a space within the ring and about the portion of the male element passing therethrough into which pressure fluid may find ingress to act radially outwardly against the ring and press it into tight sealing contact with the surfaces of said counterbore and male element enlargement engaged thereby.

Another object of the invention is to provide a sealing means of the character stated wherein the sealing ring has an outside diameter so related to the outside diameter of the counterbore as to be readily inserted and self-retained therein, and a cross sectional area not exceeding the cross sectional area of the annular sealing chamber of which said counterbore forms a part.

With the above and other objects in view that will hereinafter appear, the nature of the invention will be more clearly understood by reference to the following detailed description, the appended claims and the several views illustrated in the accompanying drawings.

In the drawings:

Figure 1 is a fragmentary vertical cross sectional view illustrating cooperatively mounted valve casing and adapter port portions and the bottom closure plug of a valve assembly.

Figure 2 is a detail cross section illustrating one of the sealing rings.

Figure 3 is an enlarged fragmentary sectional view illustrating a sealing ring proportioned and placed in the valve casing counterbore in accordance with the invention, the bottom closure plug being inserted only part-way so as to contact the ring without deforming the same.

Figure 4 is a view similar to Figure 3 with the closure plug fully seated and the sealing ring in its completely deformed, sealing condition.

Figure 5 is a view similar to Figure 4 illustrating how pressure fluid finding its way behind the ring by displacing the ring at the point of minor contact will act to deform the ring and press it into tighter sealing engagement at the point of major contact.

Figure 6 is a view similar to Figure 4 with the male and female elements threadably connected instead of screw connected, and this view also illustrates a ring proportioning that will initially provide a space between the inner diameter of the ring and the outer diameter of the ring and the outer diameter of the center boss of the closure plug with the plug and casing fully assembled.

In the example of embodiment of the invention herein illustrated the sealing means is shown as effective between the casing and its bore closing plug in a valve assembly. A similar sealing means is shown in place between the port adapters and said valve casing.

In this illustration the valve casing 5 is provided with the usual rotor receiving bore 6, and the lower end of said bore as illustrated in Figure 1 receives the center boss 7 of the bottom closure plug 8. It will be noted that the bore closure plug is provided with a radial enlargement or flange which may be screw secured as at 10 to the casing. The sealing means effective between the closure plug 8 and the casing 5 to prevent egress of pressure fluid from the interior of the casing bore is generally designated 11.

In the fragmentary illustration in Figure 1, the port adapters 12 which may be removably attached to the casing in the same manner as the bore end closure plug 8 also may engage sealing means generally designated 13 in order to prevent leakage of pressure fluid between said adapters and the engaged portions of the casing.

The sealing means generally designated 11 and 13 in Figure 1 are to be understood as embodying the invention herein disclosed and claimed, and said sealing means will be disclosed in detail hereinafter. While this novel sealing means is illustrated in detail as applied between the bore end closure plug 8 and the casing 5, it will be readily apparent that it may be in like manner applied between the casing and port adapters such as are shown by reference numeral 12 or in various other installations in valve assemblies or otherwise.

The bore 6 of the casing 5 is counterbored in the manner clearly illustrated in Figures 3, 4 and 5. The counterbore is defined by an outer wall 14 or outer diameter, and by a base or bottom 15. Preferably the outer diameter or wall 14 of the counterbore parallels the opposing outer diameter of the center boss 7 of the closure plug, and the base or bottom 15 of said counterbore preferably parallels the opposing face of the radial enlargement or flange extension 9 of the closure plug. The opposing parallel walls referred to provide an annular sealing means receiving chamber which is rectangular in radial cross section as illustrated in Figures 4 and 5.

The sealing ring mountable in the sealing chamber is illustrated in detail in Figure 2 and preferably takes the form of the well known O ring which is circular in radial cross section, although it may be formed of other cross sectional shapes such as oval or polygonal. It is to be understood that this ring is formed of an outer diameter the same as, or very slightly larger, than the outside diameter or outer defining wall 14 of the casing counterbore. In this manner the ring can be easily inserted without any appreciable deformation into the counterbore and will be self-retaining therein in the manner clearly illustrated in Figure 3. It will also be noted by reference to Figure 3 that the depth of the counterbore is less than the cross section of the sealing ring 16, thus causing said ring to initially project from the counterbore in the manner illustrated in Figure 3 prior to completion of the assembly by the pressing home of the closure plug 8 by tightening of the screws 10.

When inserted in the counterbore as shown in Figure 3 the inner diameter of the sealing ring is slightly larger than the outer diameter of the center boss 7 so that the latter may be inserted through the sealing ring without contacting the same. In this manner the insertion of the center boss 7 does not deform the sealing ring to cause it to be pinched between the center boss 7 and the bore 6. Assembly of the parts is thereby greatly facilitated since it is unnecessary to take any special precautions or to use any special tools to prevent pinching of the ring when inserting the center boss 7 into the ring and bore 6.

It is important that in the final position of the parts the sealing ring be in sealing contact with the outer wall 14 as well as against the flange 9 and base 15 since otherwise fluid under pressure acting between the ring and the center boss 7 will expand the ring outwardly, stretching it so as to reduce the cross sectional dimensions and destroying the contact between the ring and either the flange 9 or base 15 so as to cause a leak. By having the ring in initial contact with the outer wall 14 and by having the ring projecting initially from the counterbore, movement of the flange 9 into tight engagement with the end of the casing 5 deforms the ring into tight engagement with the flange 9, base 15 and outer wall 14 and causes most of the deformation of the ring to be toward the center boss 7. Regardless of whether or not the ring actually comes into contact with the center boss 7, pressure of the fluid coming from within the bore 6 can act only to force the ring into still tighter sealing engagement with the flange 9, base 15, and outer wall 14.

The cross sectional dimensions of the ring and the chamber are very accurately related. It has been found that with a ring of circular cross section and a packing chamber of rectangular cross section best results are obtained when the depth and width of the chamber are about .8 and about 1.1 times the diameter of the ring, respectively. This provides sufficient initial squeeze on the ring so as to establish initial sealing contact between the flange 9, base 15, and outer wall 14 and still provide enough space in the chamber so that the volume of the ring will not exceed the volume of the chamber. Also, it has been found that the space between the ring and the center boss 7 resulting from the 1.1 relationship is sufficient to permit ready insertion of the center boss 7 without danger of pinching the ring between the center boss and the bore 6.

The combination of the .8 and 1.1 relationship referred to above provides a volumetric ratio of approximately .9 to 1 between the ring and the chamber. This volumetric ratio effectively prevents pinching or extrusion of the ring incidental to the pressing home of the closure plug from the position illustrated in Figure 3 to the complete assembled condition illustrated in Figure 4.

By proportioning the parts in the manner stated, and initially placing the outside diameter of the ring against the outer wall 14 of the counterbore, and the inner diameter of said ring spaced outwardly from the outside diameter of the closure plug center boss 7 the ring is caused to take a shape somewhat as illustrated in Figure 4 when the assembly of the casing and closure plug is completed in the manner previously described. In other words, the ring will engage in the receiving chamber at three major places of contact, namely as at 17 against the outer wall 14 of the counterbore, as at 18 against the base or bottom 15 of the counterbore, and as at 19 against the enlargement or flange extension 9 of the end closure plug 8. Said ring will also engage at a fourth or minor contact place, namely against the center boss 7 of the end closure plug.

In view of the foregoing it will be apparent that in the arrangement illustrated in Figures 3 and 4 of the drawings the ring will press less tightly against the center boss of the closure plug at the inner or minor pressure place 20 than at the other three major pressure places 17, 18, and 19. This is important because as the pressure fluid within the valve bore 16 finds its way into the sealing chamber occupied by the ring 16 it may displace the ring at the point of minor contact and provide a space 21 therebehind in the manner illustrated in Figure 5. In this manner, pressure fluid finding its way into the sealing chamber behind the ring 16 will act outwardly against said ring and serve to more tightly press the same into sealing contact with the chamber defining wall portions at the major contact places 17, 18 and 19 and thus directly aid in providing a very efficient seal.

Although the .8 and 1.1 relationships referred to above are preferred, it is to be understood that the sealing ring 16 may be proportioned or shaped with a somewhat different relation to the receiving chamber so that a space such as is illustrated at 21 may be initially provided between the inner diameter of the ring and the outer diameter of the center boss of the closure plug with the plug and casing fully assembled. Thus, for example, the width of the chamber may be increased to a dimension somewhat larger than 1.1 times the cross section width of the ring. In this case only three places of contact of the ring in the receiving chamber will be provided, and it will be unnecessary for the pressure fluid to displace the ring from its minor contact against the center boss of the closure plug. Such an arrangement is illustrated in Figure 6.

In Figure 6 there is illustrated a slight modification of the invention in which the ring is proportioned so as to provide a space inwardly thereof as just above stated, and in this illustration the closure plug and the casing are threadably connected rather than being assembled through the medium of screws. The casing is indicated at 22 and the closure plug 23 is threadably connected therewith as at 24. The sealing ring receiving chamber is designated 25 and the sealing ring is indicated at 26. The space initially provided within the ring with the casing and plug parts fully assembled is indicated at 27. It will be apparent that in the illustration in Figures 3 through 6 the casing parts take the form of bored and counterbored female elements and the closure plugs take the form of male elements the center boss portions 7 being insertable through the casing counterbore into the bore 6 thereof. It will be apparent also that the port adapters bear similar male and female relation with the casing 5.

While limited examples of form of the invention have been disclosed herein it is to be understood that the structure and arrangement of the sealing means may be variously modified without departing from the spirit and scope of the invention as defined in the appended claims.

I claim:

1. In a sealing means of the character described the combination of a female member having a bore therein in which pressure fluid is receivable, and a counterbore defined by an outer wall and a base, said counterbore being surrounded by an end face, a male element secured to said female element and having a center boss insertable in said bore through the counterbore and a radially extended flange engageable with said end face and forming an end closure for the counterbore, said boss opposing the counterbore outer wall and said flange opposing said base to form between them an annular sealing ring receiving chamber, a deformable sealing ring in said chamber and having an outside diameter only slightly larger than the diameter of the outer wall of the counterbore so as to be readily insertable in the counterbore without necessary pressure application which might cause pinching of the ring and yet be initially in self-retaining contact with said outer wall when in repose in the counterbore, said ring also being shaped and dimensioned so as to initially project from said counterbore when in repose therein and to be initially out of contact with the center boss when the latter is inserted through said counterbore, said ring being deformed into sealing contact with said outer wall, base, and flange when said flange is in engagement with said end face.

2. In a sealing means of the character described the combination of a female member having a bore therein in which pressure fluid is receivable, and a counterbore defined by an outer wall and a base, said counterbore being surrounded by an end face, a male element secured to said female element and having a center boss insertable in said bore through the counterbore and a radially extended flange engageable with said end face and forming an end closure for the counterbore, said boss opposing the counterbore outer wall and said flange opposing said base to form between them an annular sealing ring receiving chamber, a deformable sealing ring in said chamber and having an outside diameter only slightly larger than the diameter of the outer wall of the counterbore so as to be readily insertable in the counterbore without necessary pressure application which might cause pinching of the ring and yet be initially in self-retaining contact with said outer wall when in repose in the counterbore, said ring also being shaped and dimensioned so as to initially project from said counterbore when in repose therein and to be initially out of contact with the center boss when the latter is inserted through said counterbore, said ring being deformed into sealing contact with said outer wall, base, flange, and boss when said flange is in engagement with said end face.

3. In a sealing means of a character described, the combination of a female member having a bore therein in which pressure fluid is receivable, and a counterbore defined by an outer wall and a base, a male element secured to said female element and having a center boss insertable in said bore through the counterbore and having a radially extending flange forming an end closure for the counterbore, said boss opposing the counterbore outer wall and said flange opposing said base to form between them an annular sealing ring receiving chamber, a deformable sealing ring in said chamber of initially substantially circular cross-section of a diameter slightly greater than the depth of the counterbore whereby the ring will be deformed by mounting of the male element on the female element, the ring also having an outside diameter slightly greater than the diameter of the outer wall of the counterbore so as to be initially in self-retaining contact with said outer wall of the chamber, the cross sectional area of the ring also being equal to or slightly less than the cross sectional area of the chamber and the width of the chamber being slightly greater than the initial cross-section diameter of the ring whereby there will be an initial space between the ring and the center boss into which the ring may be deformed by the mounting of the male element to the female element.

4. In a sealing means of the character described, the combination of a female member having a bore therein in which pressure fluid is receivable, and a counterbore defined by an outer wall and a base; a male element secured to said female element and having a center boss insertable as a closure in said bore and a radially extended flange forming an end closure for the counterbore, said boss opposing the counterbore outer wall and said flange opposing said counterbore base to form between them an annular sealing ring receiving chamber; and a deformable sealing ring in said chamber of initially a substantially circular cross section, the depth of the counterbore being approximately .8 of the cross section diameter of the ring and the width of the chamber being approximately 1.1 times the cross section diameter of the ring so that said ring will be deformed by said flange to engage in sealing contact against said counterbore wall and base and also said flange and center boss without extrusion and pinching of any ring portion between the flange and the female member, said ring having an outside diameter only slightly larger than the diameter of the outer wall of the counterbore so as to be readily insertable in the counterbore without necessary pressure application which might cause pinching of the ring and yet be initially in contact with said outer wall, and the inside diameter of said ring being larger than the outside diameter of the center boss so that there can be no danger of pinching of the ring during insertion of said boss therethrough.

5. In a sealing means of the character described, the combination of a female member having a bore therein in which pressure fluid is receivable, and a counterbore defined by an outer wall and a base; a male element secured to said female element and having a center boss insertable as a closure in said bore and a radially extended flange forming an end closure for the counterbore, said boss opposing the counterbore outer wall and said flange opposing said counterbore base to form between them an annular sealing ring receiving chamber; and a sealing ring in said chamber of initially circular radial cross section of a diameter greater than the depth of the counterbore but less than the width of said chamber, said ring inherently having an outside diameter slightly greater than that of the outer wall of the counterbore so as to be initially self retaining therein, and said ring cross section being so proportioned with relation to the radial cross section of said chamber as to be deformed by mounting of the male element to engage in major sealing contact against said counterbore wall and base and also said flange, and in minor sealing contact against the center boss to be displaceable by ingress of pressure fluid from said bore from said minor contact to form a space inwardly of the ring in which said fluid may act outwardly against the ring and increase its sealing pressure at said three major contacts.

ROBERT H. DAVIES.

References Cited in the file of this patent

UNITED STATES PATENTS

| Number | Name | Date |
|---|---|---|
| 718,643 | Lees | Jan. 20, 1903 |
| 759,081 | Delehanty | May 3, 1904 |
| 808,457 | Krover | Dec. 26, 1905 |
| 1,478,108 | Dieter | Dec. 18, 1923 |
| 1,888,459 | Greve | Nov. 22, 1932 |
| 2,445,802 | Robinson | July 27, 1948 |
| 2,459,668 | Melichor | Jan. 18, 1949 |
| 2,537,249 | Walton | Jan. 9, 1951 |

FOREIGN PATENTS

| Number | Country | Date |
|---|---|---|
| 207,855 | Great Britain | Dec. 4, 1923 |
| 504,303 | Great Britain | Apr. 24, 1939 |